US009565327B2

(12) United States Patent
Sasadai (10) Patent No.: US 9,565,327 B2
(45) Date of Patent: Feb. 7, 2017

(54) INFORMATION PROCESSING DEVICE THAT RESPONDS TO PACKET RECEIVED FROM NETWORK AND METHOD OF RESPONDING TO PACKET

(71) Applicant: KYOCERA Document Solutions Inc., Osaka (JP)

(72) Inventor: Koji Sasadai, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/141,721

(22) Filed: Apr. 28, 2016

(65) Prior Publication Data

US 2016/0323470 A1 Nov. 3, 2016

(30) Foreign Application Priority Data

Apr. 28, 2015 (JP) .................................. 2015-092176

(51) Int. Cl.
| | | |
|---|---|---|
| G06F 3/12 | (2006.01) | |
| H04N 1/00 | (2006.01) | |
| G03G 15/00 | (2006.01) | |
| G06F 1/32 | (2006.01) | |

(Continued)

(52) U.S. Cl.
CPC ...... *H04N 1/00891* (2013.01); *G03G 15/5004* (2013.01); *G06F 1/32* (2013.01); *G06F 3/1221* (2013.01); *G06F 3/1236* (2013.01); *G06F 3/1285* (2013.01); *G06K 15/4055* (2013.01); *H04L 45/22* (2013.01);

(Continued)

(58) Field of Classification Search
CPC .... G06F 3/1221; G06F 3/1236; G06F 3/1285; G06F 1/32; G06K 15/4055; G06K 15/1801; Y02B 60/1271; G03G 15/5004; H04L 45/22; H04N 1/00204; H04N 1/00885; H04N 1/00891; H04N 2201/0094
USPC .................................. 358/1.15, 1.1; 379/223
See application file for complete search history.

(56) References Cited

U.S. PATENT DOCUMENTS

| | | | | |
|---|---|---|---|---|
| 5,341,630 A | * | 8/1994 | Littau ..................... | A01D 46/28 56/330 |
| 2013/0222849 A1 | * | 8/2013 | Nakajima ............. | G06F 3/1287 358/1.15 |

(Continued)

FOREIGN PATENT DOCUMENTS

| | | |
|---|---|---|
| JP | 2011-142577 A | 7/2011 |
| JP | 5341630 B | 11/2013 |

*Primary Examiner* — Negussie Worku
(74) *Attorney, Agent, or Firm* — Hawaii Patent Services; Nathaniel K. Fedde; Kenton N. Fedde (57) ABSTRACT

Provided is an information processing device in which a sub response part (SRP) provides a response on behalf of a main response part (MRP) for enabling a provision of an easy coordination between the MRP and the SRP in protocol process. A network connection part is for receiving a packet from an external network. A distribution function part of a filter part distributes the packet to either one the MRP and the SRP based on a packet distribution condition. A duplicate function part of the filter part, if no response data is stored in the SRP, duplicates the packet received and gives the packets to the MRP and the SRP. Thereby, the SRP receives response data from the MRP to store the same in a response data storage area and provides a response on behalf of the MRP using the stored response data.

6 Claims, 5 Drawing Sheets

(51) Int. Cl.
*G06K 15/00* (2006.01)
*H04L 12/707* (2013.01)

(52) U.S. Cl.
CPC ..... *H04N 1/00204* (2013.01); *H04N 1/00885* (2013.01); *H04N 2201/0094* (2013.01)

(56) References Cited

U.S. PATENT DOCUMENTS

2015/0121102 A1* 4/2015 Sasadai ................ G06F 1/3209
 713/320
2015/0212767 A1* 7/2015 Sasadai ................ G06F 3/1221
 358/1.15

* cited by examiner

INFORMATION PROCESSING DEVICE THAT RESPONDS TO PACKET RECEIVED FROM NETWORK AND METHOD OF RESPONDING TO PACKET

INCORPORATION BY REFERENCE

This application is based on and claims the benefit of priority from Japanese Patent Application No. 2015-092176 filed on Apr. 28, 2015, the contents of which are hereby incorporated by reference.

BACKGROUND

The present disclosure relates to an information processing device that responds to a packet received from a network and a method of responding to a packet.

An image forming apparatus as an information processing device has been provided in the form of a typical MFP (Multifunctional Peripheral) that is capable of, for example, executing a document or image printing operation.

Some of the typical image forming apparatuses are configured to operate in either of ordinary and power saving modes, the ordinary mode being designed for providing an operation with ordinary electric power under which a response is made to a packet which comes from a network and which includes, for example, printing data, the power saving mode being designed for providing an operation with less electric power consumption under which a response is made to a part of packets from the network.

For example, in the typical image forming apparatuses that include a main system configured to respond the packet that comes from the network under the ordinary mode and a sub system configured to provide a proxy response while the main system is in the power saving mode, after a transition condition is satisfied for the main system to undergo the power saving mode, in order to prevent an unexpected return to the ordinary mode, the packet received from the external network is distributed to the sub system.

SUMMARY

An information processing device according to an exemplary embodiment of the present disclosure includes a network connection circuit, a main response circuit, and a sub response circuit. The network connection circuit includes a filter circuit that receives a packet from an external network. The filter circuit is provided with a distribution function circuit and a duplication function circuit, the distribution function circuit distributing, based on a distribution condition, the packet to either one of the main response circuit and the sub response circuit, the duplication function circuit transmitting the packet to both of the main response circuit and the sub response circuit when the duplication function circuit receives a response data request notification from the sub response circuit. The main response circuit outputs a response data of the packet that the main response circuit receives from the duplication function circuit to the sub response circuit, the sub response circuit stores the response data that is input from the main response circuit, and then the sub response circuit transmits, when the sub response circuit receives the packet that is responsible using the response data, the response data to the network connection circuit.

A packet response method according to an exemplary embodiment of the present disclosure, which is to be implemented in an information processing device that includes a network connection circuit, a main response circuit, a sub response circuit, includes the steps of (i) causing the network connection circuit to receive a packet, via a filter circuit, from an external network, (ii) causing the filter circuit to distribute the packet, based on a distribution condition, to either one of the main response circuit and the sub response circuit via a distribution function circuit, (iii) causing the filter circuit to transmit the packet to both of the main response circuit and the sub response circuit when the filter circuit receives a response data request notification from, via a duplication function circuit, from the sub response circuit, (iv) causing the main response circuit to transmit a response data of the packet which is received from the duplication function circuit to the sub response circuit, (v) causing the sub response circuit to store the response data that is received from the main response circuit, and (vi) causing the sub response circuit to transmit, when the sub response circuit receives the packet that is responsible using the response data, the response data to the network connection circuit.

DETAILED DESCRIPTION

Exemplary Embodiment

Overall Configuration of Image Forming Apparatus 1

Figure 1:
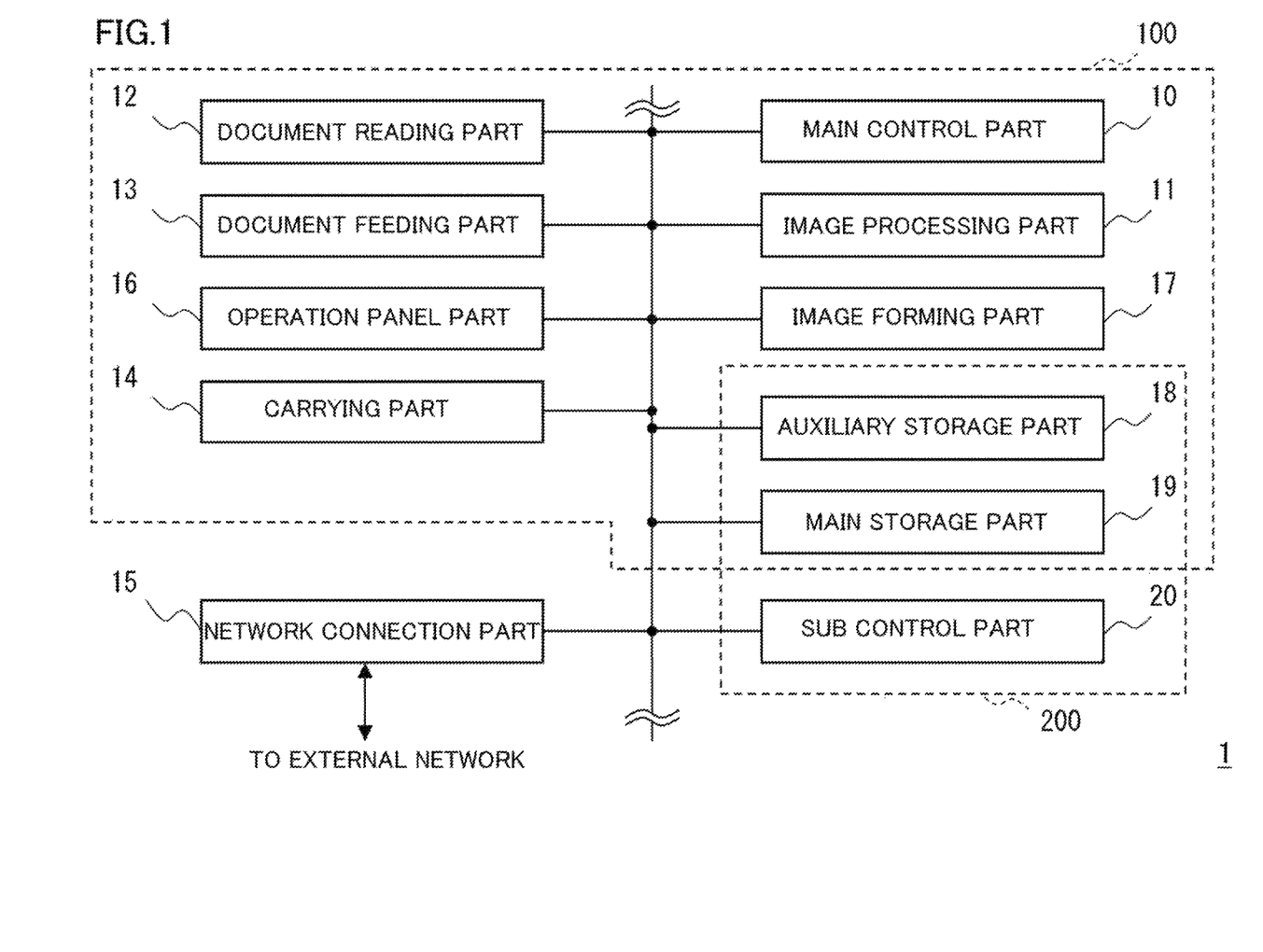
FIG. 1 illustrates an overall configuration of an image forming apparatus according to an exemplary embodiment of the present disclosure.

First of all, with reference to FIG. 1, an overall configuration of an image forming apparatus 1 is described.

The image forming apparatus 1 includes a network connection part 15, a main response part 100, and a sub response part 200.

The image forming apparatus 1 makes a transition between a ordinary mode in which the image forming apparatus operates with normal electric power consumption and a power saving mode in which the electric power consumption is less than that in the ordinary mode.

In the ordinary mode, both of the main response part 100 and the sub response part 200 are made active and respond to different packets in an asynchronous manner.

In the power saving mode, only the sub response part 200 is made active to respond to a packet.

The image forming apparatus 1 includes a main control part 10, an image processing part 11, a document reading part 12, a document feeding part 13, a carrying part 14, a network connection part 15, an operation panel part 16, an image forming part 17, an auxiliary storage part 18, a main storage part 19, a sub control part 20, and other device which are connected with each other via a common bus and otherwise different buses. The main control part 10 or the sub control part 20 controls operations of part or all of the other parts and devices.

Among the preceding parts, a main response part 100 includes the main control part 10, the image processing part 11, the document reading part 12, the document feeding part 13, the carrying part 14, the operation panel part 16, the image forming part 17, the auxiliary storage part 18, and the main storage part 19.

In addition, a sub response part 200 includes the sub control part 20, the auxiliary storage part 18, and the main storage part 19.

Each of the main control part 10 and the sub control part 20 includes at least of one of processors that include, for example, a GPP (General Purpose Processor), a CPU (Central Processing Unit), an MPU (Micro Processing Unit), a DSP (Digital Signal Processor), a GPU (Graphics Processing Unit), an ASIC (Application Specific Processor).

Each of the main control part 10 and the sub control part 20 reads control programs that are stored in a ROM and/or a HDD both of which are included in the auxiliary storage part 18 and load the control programs on the main storage part 19 for execution, thereby activating a function block which is detailed later. In addition, each of the main control part 10 and the sub control part 20 provides an overall control of the image forming apparatus 1 in response to specific instruction information that is inputted from an external terminal (not shown) or the operation panel part 16.

Each of the main control part 10 and the sub control part 20 may be, instead of being in the form of a physical CPU or the like, another CPU coping with multi core or multi thread, the another CPU being a part of "processing unit" which is capable of executing a kernel included in an OS (Operating System) independently. In addition, each of the main control part 10 and the sub control part 20 may be in the form of an AMP (Asymmetric Multiple Processor) basis configuration.

Further, the main control part 10 and the sub control part 20 may set, respectively, their own memory spaces. However, in even such a case, it may be possible to allow for mutual access between both the memory spaces.

The image processing part 11 is in the form of a processor such as a DSP (Digital Signal Processor) or a GPU (graphic Processing Unit). The image processing part 11 performs specific image processing for image data, the specific image processing including, for example, zooming, density adjustment, graduation adjustment, and image improvement.

The document reading part 12 is a scanner that reads a document that has been set.

The document feeding part 13 is a mechanism that feeds the document to the document reading part 12 for being read.

The image forming part 17 forms an image on a recording paper by a data that is stored in the main storage part 19 or the auxiliary storage part 18, read by the document reading part 12, or acquired from an external terminal pursuant to an instruction from a user.

The carrying part 14 is a mechanism that performs operations that include carrying a recording paper from a paper feeding cassette (not shown), causing the recording paper to undergo image processing at the image forming part 17, and discharging the image processed recording paper into a stack tray (not shown).

The network connection part 15 is in the form of a network connection circuit that includes, for example, a LAN board and a wireless transmitting/receiving device being for connection to external networks that include, for example, a LAN, a wireless LAN, a WAN, and cellular phone network. In addition, the network connection part 15 includes a memory that has a memory area in which a packet distribution condition is stored as is described later.

The network connection part 15 transmits and receives, for example, a TCP/IP packet to and from the external network, respectively.

The operation panel part 16 includes a display part such as an LCD (Liquid Crystal Display), numeric keys, a start key, a cancel key, a switching button that switches among operation modes including, for example, copying, FAX transmission, and scanner operations, a button that are to be manipulated to instruct jobs to execute, the jobs including, for example, printing, transmission, and storing of a selected document, and an input part such as a touch panel.

The operation panel part 16 accepts or acquires instructions for various jobs from the user which are performed by the image forming apparatus 1. In addition, the user's instruction acquired at the operation panel part 16 allows for inputting or changing the user information.

The auxiliary storage part 18 is a memory that includes, for example, a ROM (Read Only Memory), an SSD (Solid State Drive), an on-board semiconductor memory, or a HDD (Hard Disk Drive). The auxiliary storage part 18 contains areas in which various programs and data are stored.

Of these memories, the semiconductor memories that are available as the auxiliary storage part 18 include nonvolatile memories such as an EEPROM, an NAND type flash memory, a NOR type flash memory, a MRAM, and ReRAM.

In addition, the ROM or HDD of the auxiliary storage part 18 stores a control program including a firmware that is designed to control the operation of the image forming apparatus 1. Further, the auxiliary storage part 18 may contain storage holder regions that are formed on a per-user basis.

The main storage part 19 is a memory such as one of semiconductor memories that includes, for example, a DRAM (Dynamic Random Access Memory), an SRAM, and an MRAM. The main storage part 19 has areas in which programs and data that are read from the auxiliary storage part 18.

The main storage part 19 stores, in a temporal manner, a packet received at the network connection part 15, a response packet created at the main control part 10 or sub control part 20, or the like. At this time, the main storage part 19 may so store the packet as to be accessible from all of the network connection part 15, the main control part 10, and the sub control part 20. In addition, the main storage part 19 may store, for example, a packet in a system of FIFO or network stack.

It is to be noted that in the image forming apparatus 1, the main control part 10, the image processing part 11, and the sub control part 20 may be formed into an integrated configuration such as a CPU having a built-in GPU or the like, or a chip-on-module package.

In addition, the image forming apparatus 1 may be equipped with a FAX transmission/reception part that implements facsimile transmission/reception.

[Control Configuration of Image Forming Apparatus 1]

Figure 2:
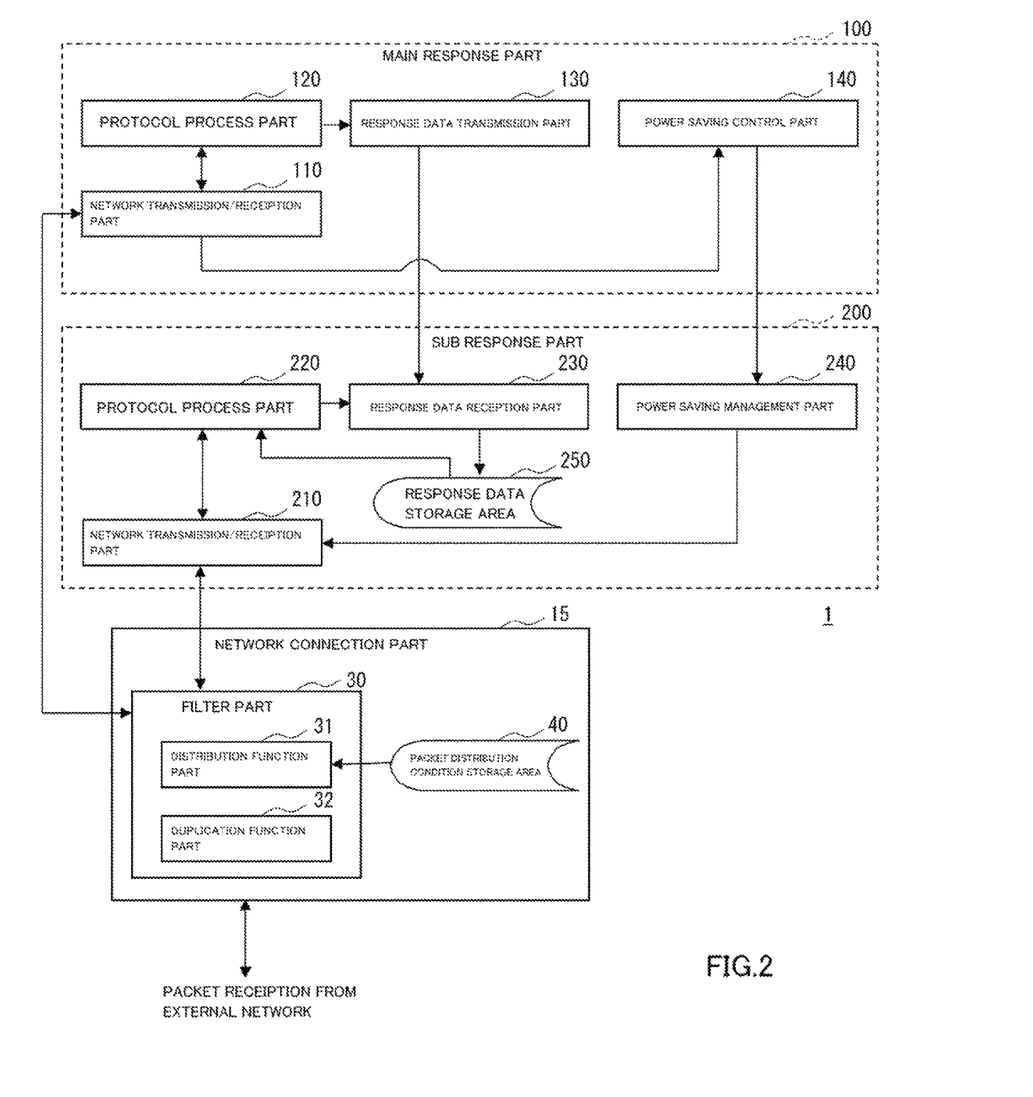
FIG. 2 illustrates a control configuration of the image forming apparatus that is illustrated in FIG. 1.

Next, with reference to FIG. 2, a description is made as to a control configuration of each of the network connection part 15, the main response part 100, and the sub response part 200 of the image forming apparatus 1.

The network connection part 15 includes a filter part 30 and a packet distribution condition storage area 40.

In addition, the main response part 100 includes a network transmission/reception part 110, a protocol process part 120, a response data transmission part 130, and a power saving control part 140.

Further, the sub response part 200 includes a network transmission/reception part 210, a protocol process part 220, a response data reception part 230[H1], a power saving management part 240, and a response data storage area 250.

Each of the filter part 30, the network transmission/reception part 110, the protocol process part 120, the response data transmission part 130, the power saving control part 140, the network transmission/reception part 210, the protocol process part 220, the response data reception part 230, and the power saving management part 240 includes a processor such as a CPU (Central Processing Unit) that has one or more circuits and is capable of executing various programs after reading thereof and various built-in programs. Here, as the circuit, an electronic part or an electronic substrate both of which is made up of plural wired elements.

The network connection part 15 receives, as described above, a packet from the external network.

The filter part 30 of the network connection part 15 includes a distribution function part 31 and a duplication function part 32.

The distribution function part 31 distributes the received packet from the external network, based on the packet distribution condition stored in the packet distribution condition storage area 40, to either one of the main response part 100 and the sub response part 200 on a per-protocol of packet basis.

The duplication function part 32 of the filter part 30 duplicates and sends the received packet from the external network to both of the main response part 100 and the sub response part 200.

In addition, the filter part 30 receives from the sub response part 200, a notification that request data of a packet that is to be responded to the received packet (hereinafter which is referred to as "response data"). It is to be noted that hereinbelow such a notification is referred to as "response data request notification".

Furthermore, the filter part 30 receives, when an operation conducted by the user or the network environment changes, a notification that request to change the response data of the packet (hereinafter, which is referred to as a "response data change request notification") from the main control part 10 or the sub control part 20.

How the filter part 30 makes processes using the distribution function part 31 and the duplication function part 32 is detailed later.

In the packet distribution condition storage area 40, the condition is stored which is set by the distribution function part 31, to distribute a packet to either one of the main response part 100 and the sub response part 200. For example, a ordinary mode packet, including a packet of a protocol dealing with printing data, to which only the main response part 100 can respond is so set as to be distributed to the main response part 100. On the other hand, a packet, including another packet of a protocol such as ARP or SNMP, to which the sub response part 200 can respond, is so set as to be distributed to the sub response part 200.

The main response part 100, which is a main system to be executed in an ordinary mode, processes a packet that is received from the distribution function part 31 or the duplication function part 32 of the filter part 30.

The network transmission/reception part 110 receives a packet from the distribution function part 31 or the duplication function part 32 of the filter part 30 and transmit the packet to the protocol process part 120.

In addition, the network transmission/reception part 110 transmits, when receives response data from the protocol process part 120, the response data to the network connection part 15.

Further, the network transmission/reception part 110 outputs, when receives no packet from the distribution function part 31 of the filter part 30 within a specific time period, a power saving mode transition notification to the power saving control part 140.

Moreover, the network transmission/reception part 110 outputs, when receives an ordinary mode transition notification from the protocol process part 120, the ordinary mode transition notification to the power saving control part 140.

The protocol process part 120 that is in the power saving mode, when being inputted with the packet from the network transmission/reception part 110, outputs the ordinary mode transition notification to transition ordinary mode to the network transmission/reception part 110. On transition to the ordinary mode, the protocol process part 120 causes each the part to execute necessary process for the packet in order to create the response data. Then, the protocol process part 120 outputs the response data in the packet received from the distribution function part 31 to the network transmission/reception part 110 and outputs the response data in the packet received from the duplication function part 32 to the network transmission/reception part 110 and the response data transmission part 130. It is to be noted when the packet is transmitted from either one of the distribution function part 31 and the duplication function part 32, the packet is to be provided with information that is indicative of the source of transmission.

The response data transmission part 130 transmits, when being inputted with a response data from the protocol process part 120, the response data to the response data reception part 230 of the sub response part 200.

The power saving control part 140 makes the transition, when being inputted with the power saving mode transition notification from the network transmission/reception part 110, various parts to the power saving mode and upon establishment of the power saving mode, and transmits a power saving mode transition completion notification to the power saving management part 240 of the sub response part 200. In addition, power saving control part 140 makes the transition, when being inputted with the ordinary mode transition notification from the protocol process part 120, the various parts to the ordinary mode and upon establishment of the ordinary mode, and transmits an ordinary mode transition completion notification to the power saving management part 240 of the sub response part 200.

The sub response part 200, which is designed to act as a sub system to be run in the ordinary mode and the power saving mode, processes the packet that is received from the distribution function part 31 and the duplication function part 32 of the filter part 30.

The network transmission/reception part 210 receives a packet from the distribution function part 31 or the duplication function part 32 of the filter part 30 and to output to the protocol process part 220.

The network transmission/reception part 210 also transmits, when receives response data from the protocol process part 220, the response data to the network connection part 15.

The protocol process part 220 causes, when being inputted with the packet from network transmission/reception part 210 and when the packet is received from the distribution function part 31, each the part to execute necessary process for the packet in order to prepare response data or derive the packet response data from the response data storage area 250. Then, the protocol process part 220 outputs the response data to the network transmission/reception part 210. Alternatively, when the inputted packet comes from the duplication function part 32, the protocol process part 220 transmits the inputted packet to the response data reception part 230.

The response data reception part 230 causes, when being inputted with the packet from the protocol process part 120 and when receives the response data from the response data transmission part 130, the response data storage area 250 to store the packet and the response data.

The power saving management part 240 receives the power saving mode transition completion notification or the normal mode transition completion notification from the main response part 100.

The response data storage area 250, which is provided in the auxiliary storage part 18, stores a plurality of paired combinations, each of which is made up of a packet and its corresponding response data.

[Packet Response Process by Image Forming Apparatus]

Figure 3:
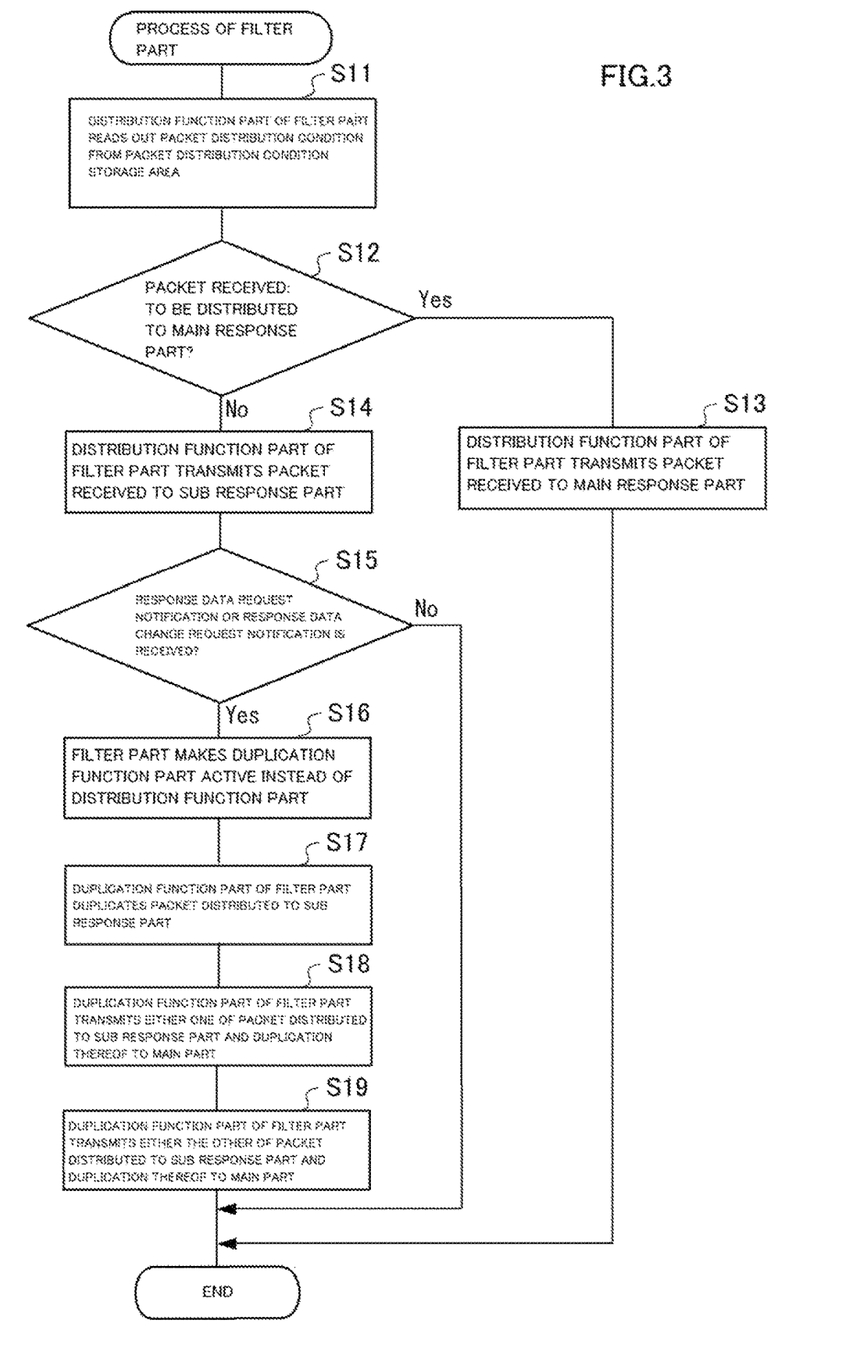
FIG. 3 represents flowchart steps that cause a filter part to operate in a packet response process according to an exemplary embodiment of the present disclosure.
Figure 4:
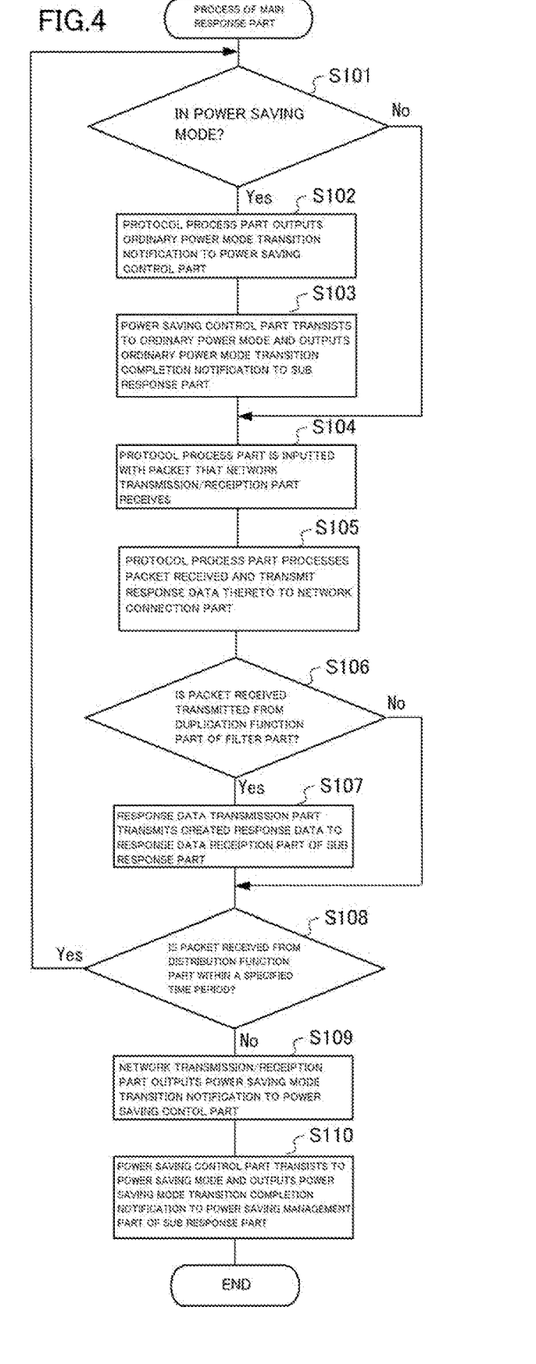
FIG. 4 represents flowchart steps that cause a main response part to operate in the packet response process according to an exemplary embodiment of the present disclosure.
Figure 5:
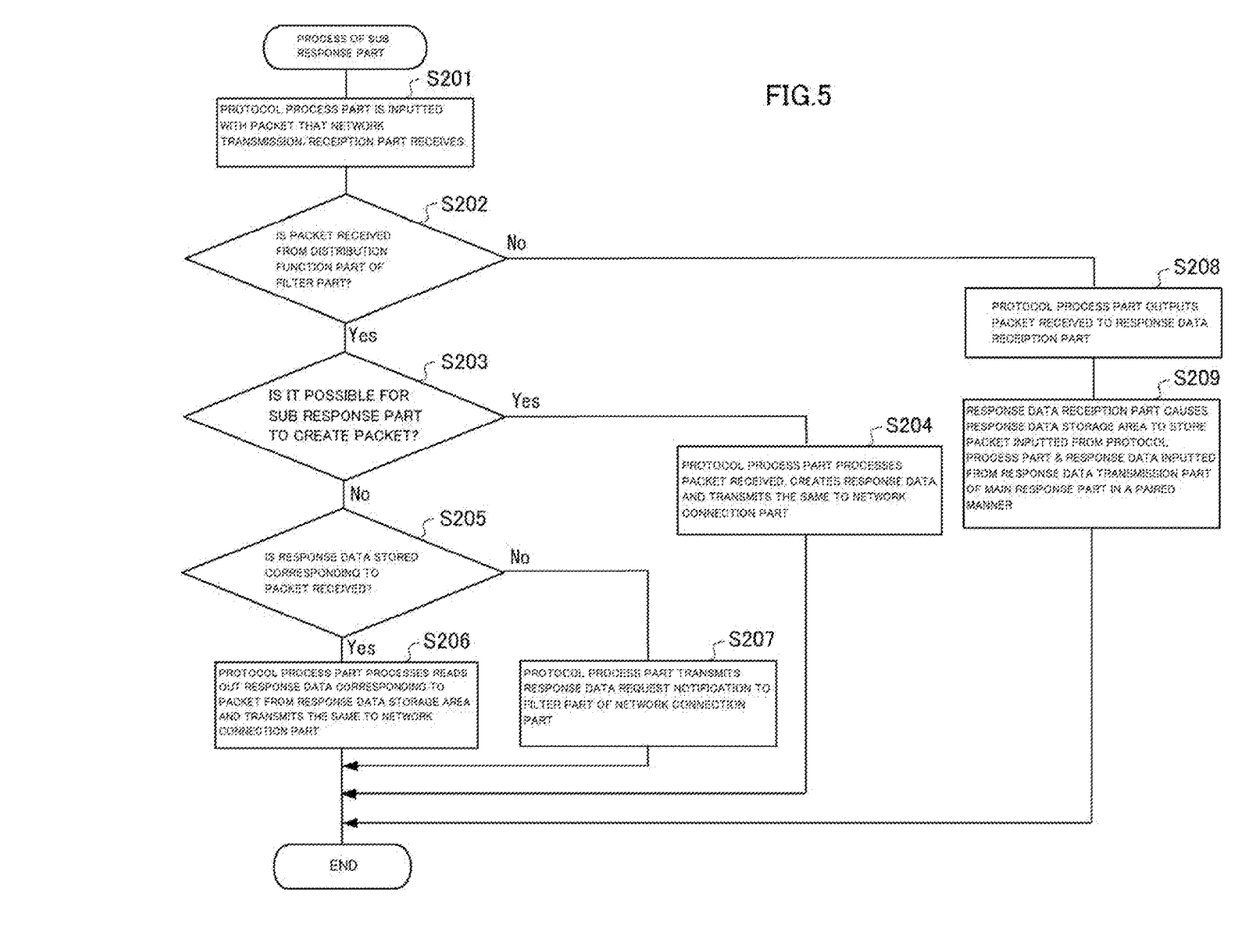
FIG. 5 represents flowchart steps that cause a sub response to operate in a packet response process according to an exemplary embodiment of the present disclosure.

Next, with reference to FIG. 3 to FIG. 5, a description is made as to how a packet response process is executed by the image forming apparatus 1 according to the exemplary embodiment of the present disclosure.

In the packet response process of the present exemplary embodiment, the packet received from the external network is distributed by the distribution function part 31 of the filter part 30 in a suitable manner, based on the distribution condition that is set on-per packet protocol basis, to either one of the main response part 100 and the sub response part 200 for causing either one of the main response part 100 and the sub response part 200 to make a response. In addition, if the sub response part 200 has no response data that corresponds to the packet distributed to the sub response part 200, the sub response part 200 memorizes response data that is created by the main response part 100 and the sub response part 200 makes, when receives the same packet in the next, responses on behalf of the main response part 100.

First of all, with reference to a flowchart illustrated in FIG. 3, a detailed description is made in a step-by-step manner as to a process that is to be implemented in the filter part 30 in the packet response process according to the present exemplary embodiment. It is to be noted that the filter part 30 starts its process immediately upon receipt of a packet from the external network.

(Step S11)

At first, the distribution function part 31 of the filter part 30, when receives a packet from the external network, reads out the packet distribution condition from the packet distribution condition storage area 40.

(Step S12)

Then, based on the packet distribution condition, the distribution function part 31 of the filter part 30 determines whether or not the packet received should be distributed to the main response part 100. If the packet received should be distributed to the main response part 100 (Yes in Step S12), the control goes to step S13. If the packet received should be distributed to the sub response part 200 (No in Step S12), the control goes to S14.

(Step S13)

The result of Step S12 which is indicative of Yes, the distribution function part 31 of the filter part 30 transmits the packet received to the network transmission/reception part 110 of the main response part 100 and the process of the filter part 30 is terminated.

(Step S14)

The result of Step S12 which is indicative of No, the distribution function part 31 of the filter part 30 transmits the packet received to the network transmission/reception part 210 of the sub response part 200.

(Step S15)

Then, the distribution function part 31 of the filter part 30 determines whether or not the filter part 30 receives the response data request notification or the response data change request notification. If the filter part 30 receives the response data request notification or the response data change request notification (Yes in Step S15), the control goes to Step S16. If the filter part 30 does not receive the response data request notification or the response data change request notification the data (No in Step S15), the distribution function part 31 of the filter part 30 terminates the process.

(Step S16)

The result of Step S15 which is indicative of Yes, the filter part 30 makes the duplication function part 32 active instead of the distribution function part 31.

(Step S17)

Then, the duplication function part 32 of the filter part 30 duplicates the packet that is distributed to the sub response part 200 in Step S14.

(Step S18)

Then, the duplication function part 32 of the filter part 30 transmits either one of the packet and the duplicated packet to the main response part 100.

Then, the duplication function part 32 of the filter part 30 transmits the other one of the packet and the duplicated packet to the sub response part 200 and thereafter the process of the filter part 30 is terminated.

Next, with reference to a flowchart illustrated in FIG. 4, a detailed description is made in a step-by-step manner as to a process that is to be implemented in the main response part 100 in the packet response process according to the present exemplary embodiment. It is to be noted that in the main response part 100, the protocol process part 120 starts its process immediately when a packet that the network transmission/reception part 110 receives is outputted to the protocol process part 120.

(Step S101)

First of all, the protocol process part 120 determines whether or not each of the part is in the power saving mode. If each of the part is in the power saving mode (Yes in Step S101), the control goes to step S102. If each of the parts is the ordinary mode (No in Step S101), the control goes to Step S104.

(Step S102)

The result of Step S101 which is indicative of Yes, the protocol process part 120 causes the network transmission/reception part 110 to output an ordinary mode transition notification to the power saving control part 140.

(Step S103)

Then, the power saving control part 140, when receives the ordinary mode transition notification, brings each of the part into the ordinary mode and transmits an ordinary mode transition complete notification to the power saving management part 240 of the sub response part 200.

(Step S104)

Subsequent to Step S103 or pursuant to the result of Step S101 which is indicative of No, the protocol process part 120 receives the packet that the network transmission/reception part 110 receives.

(Step S105)

Then, the protocol process part 120 collaborates with each of the parts to execute a process pursuant to the protocol of the data included in the packet received. For example, if the packet contains printing data, the protocol process part 120 transmits the printing data to the image forming part 17 for making a print.

The protocol process part 120 also creates response data corresponding to the packet received and causes the network transmission/reception part 110 to transmit the response data to the network connection part 15.

(Step S106)

Then, the protocol process part 120 determines whether or not the packet received is transmitted from the duplication function part 32 of the filter part 30. If the packet received is transmitted from the duplication function part 32 of the filter part 30 (Yes in Step S106), the control goes to Step S107. If the packet received is transmitted from the distribution function part 31 of the filter part (No in Step S106), the control goes to Step S108.

(Step S107)

The result of Step S101 which is indicative of Yes, the response data transmission part 130 transmits the response data created in Step S105 to the response data reception part 230 of the sub response part 200.

(Step S108)

Then, it is determined whether or not the network transmission/reception part 110 receives, within a specific time duration, the packet from the distribution function part 31 of the filter part 30. If the network transmission/reception part 110 receives, within the specific time duration, the packet from the distribution function part 31 (Yes in Step S108), the control goes to Step S101. If the network transmission/reception part 110 does not receive, within the specific time duration, the packet from the distribution function part 31 (No is Step S108), the control goes to Step S109.

(Step S109)

The result of Step S108 which is indicative of No, the network transmission/reception part 110 outputs the power saving mode transition notification to the power saving control part 140.

(Step S110)

Then, The power saving control part 140, when brings each of the parts in the power saving mode, transmits a power saving mode transition complete notification to the sub response part 200 and thereafter the process of the main response part 100 is terminated.

Next, with reference to a flowchart illustrated in FIG. 5, a detailed description is made in a step-by-step manner as to a process that is to be implemented in the sub response part 200 in the packet response process according to the present exemplary embodiment. It is to be noted that in the sub response part 200, the protocol process part 220 starts its process immediately when a packet that the network transmission/reception part 210 receives is outputted to the protocol process part 220.

(Step S202)

At first, the protocol process part 220 is inputted with the packet that the network transmission/reception part 210 receives.

(Step S202)

Then, the protocol process part 220 determines whether or not the packet is received from the distribution function part 31 of the filter part 30. If the packet is received from the distribution function part 31 of the filter part 30 (Yes in Step S202), the control goes to Step S203. If the packet is received from the duplication function part 32 of the filter part 30 (No in Step S202), the control goes to Step S208.

(Step S203)

The result of Step S202 which is indicative of Yes, the protocol process part 220 determines whether or not the packet is capable of allowing the sub response part 200 to create a response data. If the packet is capable of allowing the sub response part 200 to create a response data (Yes in Step S203), the control goes to Step S204. If the packet is incapable of allowing the sub response part 200 to create a response data (No in Step S203), the control goes to Step S205.

(Step S204)

The result of Step S203 which is indicative of Yes, the protocol process part 220 causes each of the protocols of the respective packets to control each of the respective parts to create response data and causes the network transmission/reception part 210 to transmit the response data to the network connection part 15, and the process of the sub response part 200 is terminated.

(Step S205)

The result of Step S203 which is indicative of No, the protocol process part 220 determines whether or not the response data corresponding to the packet received is stored in the response data storage area. If the response data corresponding to the packet is stored in the response data storage area (Yes in Step S205), the control goes to Step S206. If no response data corresponding to the packet is stored in the response data storage area (No in Step S205), the control goes to Step S207.

(Step S206)

The result of Step S205 which is indicative of Yes, the protocol process part 220 reads out the response data corresponding to the packet receive from the response data storage area 250 and causes the network transmission/reception part 210 to transmit the response data to the network connection part 15, and the process of the sub response part 200 is terminated.

(Step S207)

The result of Step S205 which is indicative of No, the protocol process part 220 transmits a response data request notification corresponding to the packet received to the filter part 30 of the network connection part 15, and the process of the sub response part 200 is terminated.

(Step S208)

The result of Step S202 which is indicative of No, the protocol process part 220 outputs the packet received to the response data reception part 230.

(Step S209)

Then, the response data reception part 230, when receives the response data corresponding to the packet from the response data transmission part 130 of the main response part 100, causes the response data storage area 250 to store the packet inputted from the protocol process part 220 and the response data received from the main response part 100 in a paired manner. Then, the response data reception part 230 terminates the process of the sub response part 200.

As detailed above, if the sub response part 200 is unable to prepare response data or is out of memory of response data, the distribution function part 31 and the duplication function part 32 of the filter part 30 causes the sub response part 200 to store the response data which the main response part 100 creates and allows the sub response part 200 to provide a proxy response including the response data that the sub response part 200 contains upon receipt of the same protocol packet.

In addition, as for a protocol packet required for acquiring cash or transiting a condition, if both of the main response part 100 and the sub response part 200 respond, sometimes it is difficult to coordinate the main response part 100 and the sub response part 200 in protocol process. However, in the present exemplary embodiment, it is possible to provide an easy coordination between the main response part 100 and the sub response part 200 in protocol process due to the facts that the distribution function part 31 distributes the packet to either one of the main response part 100 and the sub response part 200, and if is it unable to respond to the packet that is distributed to the sub response part 200, the duplication function part 32 causes the main response part 100 to respond to the packet, which allows for a transmission of the response data to the sub response part 200.

Further, in response to a user's operation or change in network environment, the main control part 10 or the sub control part 20 transmits the response data change request notification to the filter part 30, which enables the sub response part 200 to provide the proxy response including the updated response data that the main response part 100 creates.

The typical image forming apparatuses suffer from drawbacks that the main system and the sub system require the same protocol of a similar packet and coordinating both of the protocol process parts of the respective main and sub systems becomes very difficult if both of the protocol process parts respond to the same protocol of a similar packet.

The present disclosure, which is made in view of the aforementioned circumstances, has an object to provide an information processing device and a method of responding to a packet.

According to the present disclosure, some of packets to which a response part of the main system (which is referred to as "a main response part") that is in the ordinary mode responds are distributed to a response part of the sub system (which is referred to as "a sub response part") that is in the power saving mode in order for the sub response part to provide proxy responses, which brings an easy coordinate between the main response part and the sub response part in protocol process, and which makes it possible to provide an information processing device and a method of responding to a packet both of which are capable of providing an effective response to the packet.

It is to be noted that in the description of the exemplary embodiment of the present disclosure, the main control part 10 and the sub control part 20 offer the respective controls to the main response part 100 and the sub response part 200. However, a part or whole of the main response part 100 and the sub response part 200 may be formed as, for example, a dedicated ASIC (Application Specific Integrated Circuit). On the other hand, the function of the filter part 30 may be realized by executing a program that is loaded from the auxiliary storage part 18 on the main storage part 19.

With at least one of such configurations, it is possible to optimize, as a whole, the effective packet response, which enables cost reduction.

In addition, in the description of the exemplary embodiment, the main control part 10 and the sub control part 20 share both of the auxiliary storage part 18 and the main storage part 19.

However, a configuration is also available wherein the main control part 10 and the sub control part 20 include their own auxiliary storage parts 18 or main storage parts 19. In such a configuration, a data communication transmitted and received may be established, via a shared memory or the like, between the main control part 10 and the sub control part 20.

In such configurations, the sub response part 200 is available as an easy detachable network board or the like.

Further, the present disclosure may be applied to or available in information processing devices other than the image forming apparatus. More specifically, the present disclosure may be embodied as a configuration that uses, for example, an information device to which a network scanner or scanner is connected via an USB or the like in a separate manner.

According to the information processing device and the packet response method, some of packets to which the main response part that is in the ordinary mode responds are distributed to the sub response part that is in the power saving mode in order that the sub response part respond to such packets on behalf of the main response part, which results in an easy coordination between the main response part and the sub response part in protocol process together with an effective packet response.

Moreover, the configuration and operation of the aforementioned exemplary embodiment are examples and therefore manifestly it is capable of modification and rearrangement of parts without departing from the spirit and scope of the present disclosure.

What is claimed is:

1. An information processing device, comprising:
a network connection circuit;
a main response circuit; and
a sub response circuit,
the network connection circuit including a filter circuit that receives a packet from an external network,
the filter circuit including a distribution function circuit and a duplication function circuit,
the distribution function circuit distributing, based on a distribution condition, the packet to either one of the main response circuit and the sub response circuit,
the duplication function circuit transmitting the packet to both of the main response circuit and the sub response circuit when the duplication function circuit receives a response data request notification from the sub response circuit,
the main response circuit outputting a response data of the packet that the main response circuit receives from the duplication function circuit to the sub response circuit, and
the sub response circuit storing the response data that is input from the main response circuit,
the sub response circuit transmitting, when the sub response circuit receives the packet that is responsible using the response data, the response data to the network connection circuit.

2. The information processing device according to claim 1, wherein
the sub response circuit transmits, when being incapable of responding to the packet received from the distribution function circuit, the response data request notification to the filter circuit, and
the filter circuit makes, when receives the response data request notification, the duplication function circuit active instead of the distribution function part.

3. The information processing device according to claim 1, wherein
the sub response circuit transmits a response data change request notification to the filter circuit if a user operation or a network environment changes,
the filter circuit makes, when receives the response data change request notification, the duplication function circuit active instead of the distribute function part.

4. The information processing device according to claim 1, wherein
the main response circuit includes a response data transmission circuit that transmits the response data to the sub response circuit, and
the sub response circuit includes
a response data receipt circuit that receives the response data from the main response circuit and
a response data storage circuit that stores the response data that the response data reception circuit receives.

5. The information processing device according to claim 1, wherein the main response circuit is put into a power saving mode unless main response circuit receives the packet from the filter circuit within a specific time duration.

6. A packet response method that is to be implemented in an information processing that includes a network connection circuit, a main response circuit, and a sub response circuit comprising:
causing the network connection circuit to receive a packet, via a filter circuit, from an external network;
causing the filter circuit to distribute the packet, based on a distribution condition, to either one of the main response circuit and the sub response circuit via a distribution function circuit;
causing the filter circuit to transmit the packet to both of the main response circuit and the sub response circuit when the filter circuit receives a response data request notification from, via a duplication function circuit, from the sub response circuit;
causing the main response circuit to transmit a response data of the packet which is received from the duplication function circuit to the sub response circuit;
causing the sub response circuit to store the response data that is received from the main response circuit; and
causing the sub response circuit to transmit, when the sub response circuit receives the packet that is responsible using the response data, the response data to the network connection circuit.

* * * * *